(12) United States Patent
Kwon et al.

(10) Patent No.: US 9,071,395 B2
(45) Date of Patent: Jun. 30, 2015

(54) METHOD AND APPARATUS FOR CHANGING FREQUENCY BAND USED FOR COMMUNICATION BETWEEN DEVICES SUPPORTING MULTIPLE FREQUENCY BANDS

(75) Inventors: Hyuk-choon Kwon, Seoul (KR); Hae-young Jun, Seoul (KR); Ho-dong Kim, Gwacheon-si (KR); Soo-yeon Jung, Seoul (KR); Dong-seek Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1008 days.

(21) Appl. No.: 12/941,219

(22) Filed: Nov. 8, 2010

(65) Prior Publication Data

US 2011/0110440 A1    May 12, 2011

Related U.S. Application Data

(60) Provisional application No. 61/293,286, filed on Jan. 8, 2010, provisional application No. 61/258,709, filed on Nov. 6, 2009.

(30) Foreign Application Priority Data

Mar. 30, 2010 (KR) ........................ 10-2010-0028615

(51) Int. Cl.
*H04W 4/00* (2009.01)
*H04L 5/00* (2006.01)

(52) U.S. Cl.
CPC .............. *H04L 5/003* (2013.01); *H04L 5/0096* (2013.01)

(58) Field of Classification Search
CPC ........................................................ H04L 27/28
USPC .............................................................. 370/331
See application file for complete search history.

(56) References Cited

U.S. PATENT DOCUMENTS

| 8,320,355 | B1 * | 11/2012 | Ho ................................ 370/345 |
| 2006/0288393 | A1 * | 12/2006 | Park .............................. 725/100 |
| 2010/0332822 | A1 * | 12/2010 | Liu et al. ....................... 713/151 |

OTHER PUBLICATIONS

TWG MAC Editor Solomon Trainin, Carlos Cordeirol TWG PHY Editor Assaf Kasher, "WGA-D07", WGA Technical Working Group, Nov. 2009, 253 pgs. total.

* cited by examiner

*Primary Examiner* — Shripal Khajuria
(74) *Attorney, Agent, or Firm* — Sughrue Mion, PLLC

(57) ABSTRACT

A method and apparatus for changing a frequency band used for communication between first and second devices supporting multiple frequency bands. The method includes transmitting a frequency band change request frame including information regarding a communication capability of the first device and a frequency band change request for requesting to change a frequency band currently being used for communication between the first and second devices, to the second device; receiving a frequency band change response frame corresponding to the frequency band change request frame, from the second device; and selectively changing the frequency band currently being used to another frequency band based on the received frequency band change response frame.

19 Claims, 5 Drawing Sheets

FIG. 2

| 201 | 202 | 203 | 204 | 205 | 206 | 207 | | | |
|---|---|---|---|---|---|---|---|---|---|
| ELEMENT ID | LENGTH | MULTIBAND CONTROL | COMMUNICATION CAPABILITY | ALLOWED CHANNEL | CHANNEL NUMBER | BSS ID | ... | ... | ... |
| 1 | 1 | 1 | 1 | 1 | 1 | 6 | 2 | 8 | 6 |

OCTETS:

200

METHOD AND APPARATUS FOR CHANGING FREQUENCY BAND USED FOR COMMUNICATION BETWEEN DEVICES SUPPORTING MULTIPLE FREQUENCY BANDS

CROSS-REFERENCE TO RELATED PATENT APPLICATION

This application claims the benefits of U.S. Provisional Patent Application No. 61/258,709, filed on Nov. 6, 2009, and U.S. Provisional Patent Application No. 61/293,286, filed on Jan. 8, 2010, in the U.S. Patent and Trademark Office, and the benefit of Korean Patent Application No. 10-2010-0028615, filed on Mar. 30, 2010, in the Korean Intellectual Property Office, the disclosures of which are incorporated herein in their entirety by reference.

BACKGROUND

1. Field

The exemplary embodiments relate to a method and apparatus for changing a frequency band used for communication between devices.

2. Description of the Related Art

The Institute of Electrical and Electronics Engineers (IEEE) 802.11ad is currently discussing a fast session transfer (FST) method that allows one station to support multiple frequency bands in communication. For example, in this method, one station has to support, for example, 2.4 GHz, 5 GHz and 60 GHz frequency bands.

In this case, when a frequency band, (e.g., a 2.4 GHz frequency band) is currently used for communication between one station and another station, if the communication is not appropriately performed, the currently used frequency band may be changed to another frequency band (e.g., a 60 GHz or 5 GHz frequency band) to continue the communication.

SUMMARY

The exemplary embodiments provide a method and apparatus for changing a frequency band used for communication between devices.

According to an aspect of an exemplary embodiment, there is provided a method of changing a frequency band used for communication between first and second devices supporting multiple frequency bands, the method including transmitting a frequency band change request frame for requesting to change a frequency band currently being used for communication between the first and second devices, to the second device, wherein the frequency band change request frame includes information regarding a communication capability of the first device and a frequency band change request; receiving a frequency band change response frame corresponding to the frequency band change request frame, from the second device; and selectively changing the frequency band currently being used to another frequency band based on the received frequency band change response frame.

The information regarding the communication capability of the first device may include information regarding at least one of whether the first device is capable of performing a role of an access point (AP) or a personal basic service set (PBSS) control point (PCP), whether the first device supports a direct link setup (DLS), whether the first device supports a tunneled direct link setup (TDLS) and whether the first device supports an independent basic service set (IBSS) network.

The frequency band change request frame may further include preference connection information representing a type of connection that the first device desires to set with the second device in the other frequency band, and the preference connection information may represent one connection type preferred by the first device from a connection type list including at least one of a basic service set (BSS) network connection type, a PBSS network connection type, an IBSS network connection type, a DLS connection type and a TDLS connection type.

The frequency band change request frame may further include at least one of information regarding channels allowed in different countries, from among a plurality of channels of the other frequency band, information regarding a channel to be used by the first device for communication in the other frequency band, and an identifier of a network to which the first device belongs in the frequency band currently being used.

The frequency band change request frame may further include device role information representing information regarding at least one of whether the first device is performing a role of an AP or a PCP, whether the first device is using a DLS, whether the first device is using a TDLS and whether the first device is operating as a station in an IBSS network, in the other frequency band.

The frequency band change response frame may include information regarding whether to accept or reject the frequency band change request of the frequency band change request frame, and may selectively further include information regarding a communication capability of the second device.

The selectively changing of the frequency band currently being used may include changing the frequency band currently being used to the other frequency band only when the frequency band change response frame includes information for accepting the frequency band change request of the frequency band change request frame.

According to another aspect of an exemplary embodiment, there is provided an apparatus for changing a frequency band used for communication between first and second devices supporting multiple frequency bands, the apparatus including a transmission unit for transmitting a frequency band change request frame for requesting to change a frequency band currently being used for communication between the first and second devices, to the second device, wherein the frequency band change request frame includes information regarding a communication capability of the first device and a frequency band change request; a reception unit for receiving a frequency band change response frame corresponding to the frequency band change request frame, from the second device; and a frequency band change unit for selectively changing the frequency band currently being used to another frequency band based on the received frequency band change response frame.

According to another aspect of an exemplary embodiment, there is provided a computer readable recording medium having recorded thereon a computer program for executing a method of changing a frequency band used for communication between first and second devices supporting multiple frequency bands, the method including transmitting a frequency band change request frame for requesting to change a frequency band currently being used for communication between the first and second devices, to the second device, wherein the frequency band change request frame includes information regarding a communication capability of the first device; receiving a frequency band change response frame corresponding to the frequency band change request frame, from the second device; and selectively changing the frequency band currently being used to another frequency band based on the received frequency band change response frame.

BRIEF DESCRIPTION OF THE DRAWINGS

The above and other features and aspects of the exemplary embodiments will become more apparent by describing in detail with reference to the attached drawings in which:

FIG. 2 is a structural view of a multiband information element included in a frequency band change request frame, according to an exemplary embodiment;

DETAILED DESCRIPTION OF THE EXEMPLARY EMBODIMENTS

Hereinafter, the exemplary embodiments will be described in detail with reference to the attached drawings. Expressions such as "at least one of," when preceding a list of elements, modify the entire list of elements and do not modify the individual elements of the list.

Figure 1:
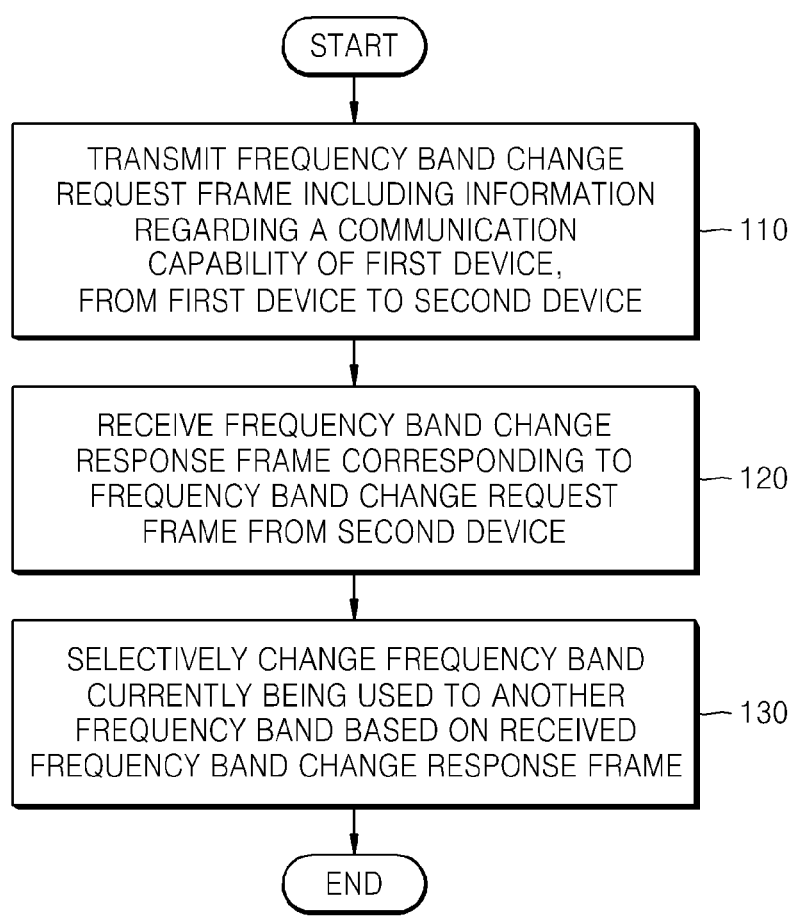
FIG. 1 is a flowchart of a frequency band change method according to an exemplary embodiment.

FIG. 1 is a flowchart of a frequency band change method according to an exemplary embodiment.

Hereinafter, a process of changing a frequency band used for communication between first and second devices supporting multiple frequency bands will be described. For example, it is assumed that the first and second devices support 2.4 GHz, 5 GHz and 60 GHz frequency bands.

In operation 110, the first device transmits a frequency band change request frame for requesting to change a frequency band currently being used for communication between the first and second devices, to the second device, wherein the frequency band change request frame includes information regarding a communication capability of the first device and a frequency band change request For example, if the first device determines that a communication state of the 60 GHz frequency band used for communication with the second device is bad, the first device may request the second device to change the frequency band currently being used to the 2.4 GHz or 5 GHz frequency band by using the frequency band change request frame.

In this case, the information regarding the communication capability of the first device includes information regarding at least one of whether the first device is capable of performing the role of an access point (AP) or a personal basic service set (PBSS) control point (PCP), whether the first device supports a direct link setup (DLS), whether the first device supports a tunneled direct link setup (TDLS) and whether the first device supports an independent basic service set (IBSS) network.

If the information regarding the communication capability of the first device is included in the frequency band change request frame as described above, the second device may obtain the information regarding the communication capability of the first device from the frequency band change request frame transmitted by the first device, and may change the frequency band currently being used based on the communication capability of the first device.

For example, if the information regarding the communication capability of the first device represents that the first device is capable of performing the role of an AP or a PCP, after the frequency band currently being used is changed, the first device may perform the role of an AP or a PCP and the second device may perform the role of a station so as to communicate with each other.

Also, if the information regarding the communication capability of the first device represents that the first device supports only a DLS, after the frequency band currently being used is changed, the first and second devices may set a direct link therebetween so as to directly communicate with each other.

Here, a DLS and a TDLS are well-known to one of ordinary skill in the art and thus will not be described in detail here.

Meanwhile, the frequency band change request frame may further include preference connection information representing the type of connection that the first device desires to set with the second device in another frequency band after the frequency band currently being used is changed to the other frequency band.

Here, the preference connection information represents one connection type preferred by the first device from a connection type list including at least one of a basic service set (BSS) network connection type, a PBSS network connection type, an IBSS network connection type, a DLS connection type and a TDLS connection type.

For example, if the connection type list includes a BSS network connection type, a PBSS network connection type and a DLS connection type, the preference connection information may represent a DLS connection type.

As described above, according to an exemplary embodiment, as the preference connection information is included in the frequency band change request frame, the second device may be notified about the connection type preferred by the first device and the first and second devices may change the frequency band currently being used based on the connection type preferred by the first device, so as to communicate with each other.

According to another exemplary embodiment, the frequency band change request frame may include a multiband information element including the information regarding the communication capability of the first device, the preference connection information and the like. The structure of the multiband information element will be described later with reference to FIG. 2.

In operation 120, a frequency band change response frame corresponding to the frequency band change request frame is received from the second device.

In this case, the frequency band change response frame may include information regarding whether to accept the frequency band change request of the frequency band change request frame. The frequency band change response frame may include information regarding whether to accept or reject the frequency band change request of the frequency band change request frame.

For example, if a communication capability of the second device does not match the information regarding the communication capability of the first device, which is included in the frequency band change request frame transmitted by the first device to the second device, the frequency band change request of the first device may be rejected. According to an exemplary embodiment, when the first device transmits the frequency band change request frame including information representing that the first device supports a DLS and a TDLS, to the second device, if the second device supports only an IBSS network, the second device may transmit the frequency band change response frame including information for rejecting the frequency band change request of the first device, to the first device.

Also, when the preference connection information is included in the frequency band change request frame transmitted by the first device to the second device, if the preference connection information represents a connection type not supported by the second device, the second device may reject the frequency band change request of the first device.

For example, when the first device transmits the frequency band change request frame including the preference connection information representing a BSS network connection type, to the second device, if the second device supports only an IBSS network, the second device may transmit the frequency band change response frame including information for rejecting the frequency band change request of the first device, to the first device.

According to another exemplary embodiment, the frequency band change response frame may further include information regarding the communication capability of the second device.

According to still another exemplary embodiment, the frequency band change response frame may include a multiband information element including the information regarding the communication capability of the second device, preference connection information representing the type of connection that the second device desires to set with the first device in another frequency band after the frequency band currently being used is changed to the other frequency band, and the like.

In operation 130, the first device selectively changes the frequency band currently being used to another frequency band based on the received frequency band change response frame.

In this case, the first device changes the frequency band currently being used to another frequency band only when the frequency band change response frame received from the second device includes information for accepting the frequency band change request of the frequency band change request frame.

For example, when the first device communicates with the second device in the 2.4 GHz frequency band, the first device may change the 2.4 GHz frequency band to the 60 GHz frequency band by transmitting the frequency band change request frame to and receiving the frequency band change response frame from the second device.

FIG. 2 is a structural view of a multiband information element 200 included in a frequency band change request frame, according to an exemplary embodiment.

Referring to FIG. 2, the multiband information element 200 includes an element identifier (ID) field 201, a length field 202, a multiband control field 203, a communication capability field 204, an allowed channel field 205, a channel number field 206 and a BSS ID field 207.

The element ID field 201 represents that the multiband information element 200 includes information regarding multiple frequency bands (multiband) supported by a first device.

The length field 202 represents the length of the multiband information element 200.

The multiband control field 203 includes device role information representing a role performed by the first device in a frequency band currently being used for communication, preference connection information described above in relation to FIG. 1, and the like.

The structure of the multiband control field 203 will be described later with reference to FIG. 3.

The communication capability field 204 includes information regarding a communication capability of the first device.

The structure of the communication capability field 204 will be described later with reference to FIG. 6.

The allowed channel field 205 includes information regarding channels allowed in different countries, from among a plurality of channels of another frequency band to which the first device desires to change the frequency band currently being used.

For example, a 60 GHz frequency band may have four channels and different countries may allow different channels from among the four channels. According to an exemplary embodiment, a particular country may allow only second and third channels of the 60 GHz frequency band and, in this case, the allowed channel field 205 may include information representing that the country allows only the second and third channels of the 60 GHz frequency band.

The channel number field 206 includes information regarding a channel to be used for communication in another frequency band if the first device changes the frequency band currently being used to the other frequency band.

For example, when the changed frequency band is the 60 GHz frequency band, if the channel number field 206 includes information representing that the third channel is used, the first device may communicate with a second device in the changed frequency band by using the third channel.

The BSS ID field 207 represents an ID of a network to which the first device belongs in the frequency band currently being used.

For example, if the first device belongs to an IBSS network in the frequency band currently being used, the BSS ID field 207 may include an ID of the IBSS network.

Meanwhile, although the multiband information element 200 included in a frequency band change request frame is described in FIG. 2, according to another exemplary embodiment, a multiband information element having the same structure as the multiband information element 200 may be included in a frequency band change response frame.

The structure of the multiband control field 203 will now be described with reference to FIG. 3.

Figure 3:
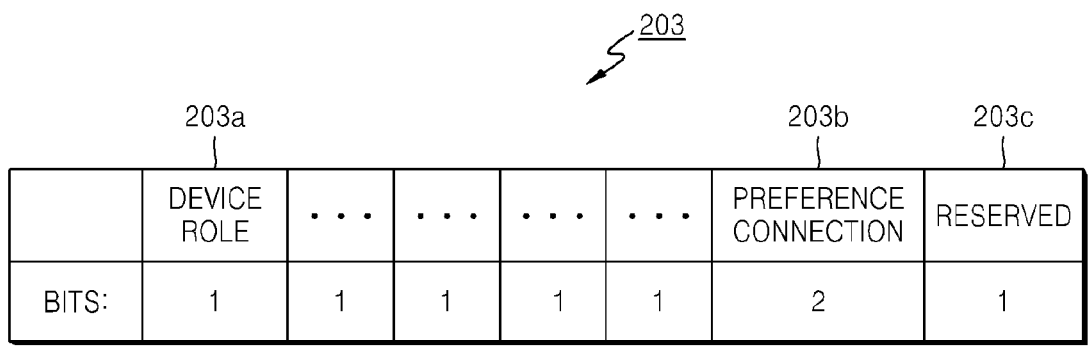
FIG. 3 is a structural view of a multiband control field illustrated in FIG. 2, according to an exemplary embodiment.

FIG. 3 is a structural view of the multiband control field 203 illustrated in FIG. 2, according to an exemplary embodiment.

Referring to FIG. 3, the multiband control field 203 includes a device role field 203a, a preference connection field 203b and a reserved field 203c.

The device role field 203a includes device role information representing information regarding at least one of whether a first device is performing the role of an AP or PCP, whether the first device is using a DLS, whether the first device is using a TDLS and whether the first device is operating as a station in an IBSS network, in another frequency band to which the first device desires to change a frequency band currently being used for communication.

For example, when the first device communicates with a second device in a first frequency band and desires to change the first frequency band to a second frequency band, if the first device currently communicates with a third device as an AP in the second frequency band, the device role field 203a may represent that the first device is performing the role of an AP in the second frequency band.

The preference connection field 203b includes preference connection information representing the type of connection that the first device desires to set with the second device in another frequency band if the first device changes the frequency band currently being used to the other frequency band.

In this case, the preference connection information represents one connection type preferred by the first device from a connection type list including at least one of a BSS network connection type, a PBSS network connection type, an IBSS network connection type, a DLS connection type and a TDLS connection type.

The structure of the preference connection field 203b will be described later with reference to FIGS. 4 and 5.

The reserved field 203c is reserved for later use.

The structure of the preference connection field 203b will now be described with reference to FIGS. 4 and 5.

Figure 4:
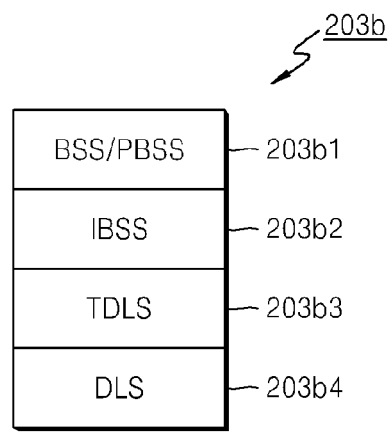
FIG. 4 is a structural view of a preference connection field illustrated in FIG. 3, according to an exemplary embodiment.

FIG. 4 is a structural view of the preference connection field 203b illustrated in FIG. 3, according to an exemplary embodiment.

Referring to FIG. 4, the preference connection field 203b includes a BSS/PBSS field 203b1, an IBSS field 203b2, a TDLS field 203b3 and a DLS field 203b4.

The BSS/PBSS field 203b1 represents whether the type of connection that a first device prefers to set with a second device in a changed frequency band is a BSS network connection type or a PBSS network connection type.

For example, in the BSS/PBSS field 203b1, a value 1 represents that the type of connection that the first device prefers to set with the second device in the changed frequency band is a BSS network connection type or a PBSS network connection type, and a value 0 represents that the type of connection that the first device prefers to set with the second device in the changed frequency band is neither a BSS network connection type nor a PBSS network connection type.

The IBSS field 203b2 represents whether the connection type that the first device prefers to set with the second device in the changed frequency band is an IBSS network connection type.

The TDLS field 203b3 represents whether the connection type that the first device prefers to set with the second device in the changed frequency band is a TDLS connection type.

The DLS field 203b4 represents whether the connection type that the first device prefers to set with the second device in the changed frequency band is a DLS connection type.

Figure 5:
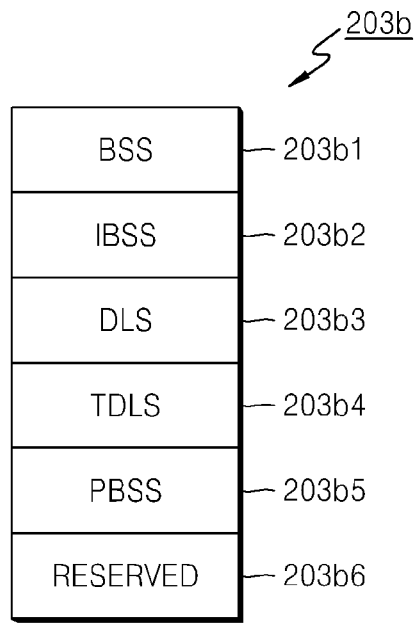
FIG. 5 is a structural view of a preference connection field illustrated in FIG. 3, according to another exemplary embodiment.

FIG. 5 is a structural view of the preference connection field 203b illustrated in FIG. 3, according to another exemplary embodiment.

Referring to FIG. 5, the preference connection field 203b includes a BSS field 203b1, an IBSS field 203b2, a DLS field 203b3, a TDLS field 203b4, a PBSS field 203b5 and a reserved field 203b6.

Differences exist between FIGS. 4 and 5 in that the BSS/PBSS field 203b1 in FIG. 4 is divided into the BSS field 203b1 and the PBSS field 203b5 in FIG. 5, and that the preference connection field 203b further includes the reserved field 203b6 in FIG. 5.

As such, unlike FIG. 4, in FIG. 5, whether a connection type that a first device prefers to set with a second device in a changed frequency band is a BSS network connection type or a PBSS network connection type is separately identified.

The structure illustrated in FIG. 4 is identical to that illustrated in FIG. 5 except for the above differences and thus repeated descriptions will not be provided here.

The structure of the communication capability field 204 illustrated in FIG. 2 will now be described with reference to FIG. 6.

Figure 6:
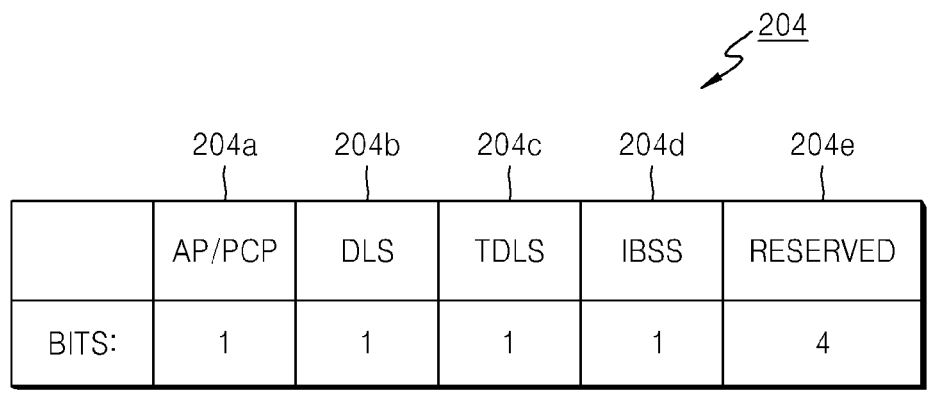
FIG. 6 is a structural view of a communication capability field illustrated in FIG. 2, according to an exemplary embodiment.

FIG. 6 is a structural view of the communication capability field 204 illustrated in FIG. 2, according to an exemplary embodiment.

Referring to FIG. 6, the communication capability field 204 includes an AP/PCP field 204a, a DLS field 204b, a TDLS field 204c, an IBSS field 204d and a reserved field 204e.

The AP/PCP field 204a represents whether a first device is capable of performing the role of an AP or a PCP.

However, according to another exemplary embodiment, the AP/PCP field 204a may be divided into an AP field (not shown) representing whether the first device is capable of performing the role of an AP and a PCP field (not shown) representing whether the first device is capable of performing the role of a PCP.

The DLS field 204b represents whether the first device supports a DLS.

The TDLS field 204c represents whether the first device supports a TDLS.

The IBSS field 204d represents whether the first device supports an IBSS network.

The reserved field 204e is reserved for later use.

Although the number of octets or bits of each field is illustrated in FIGS. 2 through FIG. 6, exemplary embodiments are not limited thereto.

Figure 7:
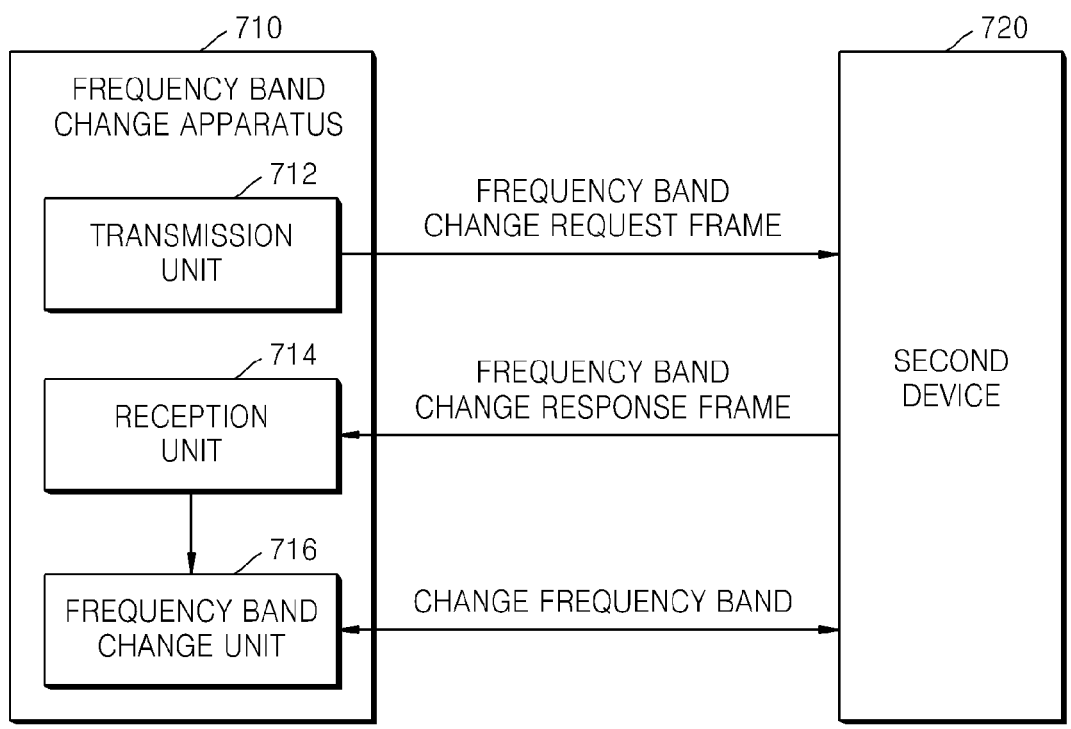
FIG. 7 is a block diagram of a frequency band change apparatus according to an exemplary embodiment.

FIG. 7 is a block diagram of a frequency band change apparatus 710 according to an exemplary embodiment.

Referring to FIG. 7, the frequency band change apparatus 710 includes a transmission unit 712, a reception unit 714 and a frequency band change unit 716. In this case, it is assumed that the frequency band change apparatus 710 is included in a first device (not shown) and a second device 720 is further illustrated for convenience of explanation. Also, it is assumed that the first device and the second device 720 support multiple frequency bands in communication.

The transmission unit 712 transmits a frequency band change request frame including information regarding a communication capability of the first device, to the second device 720.

The reception unit 714 receives a frequency band change response frame corresponding to the frequency band change request frame, from the second device 720.

The frequency band change unit 716 selectively changes a frequency band currently being used by the first device, to another frequency band based on the frequency band change response frame received by the reception unit 714.

If the frequency band change unit 716 changes the frequency band currently being used to the other frequency band, the first device and the second device 720 ultimately communicate with each other in the changed frequency band.

The exemplary embodiments can be written as computer programs and can be implemented in general-use digital computers that execute the programs using a computer readable recording medium.

Examples of the computer readable recording medium include magnetic storage media (e.g., ROM, floppy disks, hard disks, etc.), optical recording media (e.g., CD-ROMs, or DVDs), etc.

While the present invention has been particularly shown and described with reference to exemplary embodiments thereof, it will be understood by one of ordinary skill in the art that various changes in form and details may be made therein without departing from the spirit and scope of the invention as defined by the following claims. The exemplary embodiments should be considered in a descriptive sense only and not for purposes of limitation. Therefore, the scope of the invention is defined not by the detailed description of the invention but by the following claims, and all differences within the scope will be construed as being included in the present invention.

What is claimed is:

1. A method of changing a frequency band used for communication between a first device and a second device, the first and the second devices supporting multiple frequency bands, the method comprising:
   transmitting a frequency band change request frame for requesting a change in a frequency band currently being used for communication between the first and the second devices, to the second device, wherein the frequency band change request frame comprises information regarding a communication capability of the first device;
   receiving a frequency band change response frame corresponding to the frequency band change request frame, from the second device; and
   selectively changing the frequency band currently being used to another frequency band based on the received frequency band change response frame,
   wherein the frequency band change response frame comprises information regarding whether to accept or reject the frequency band change request of the frequency band change request frame.

2. The method of claim 1, wherein the information regarding the communication capability of the first device comprises information regarding at least one of whether the first device is capable of performing a role of an access point (AP) or a personal basic service set (PBSS) control point (PCP), whether the first device supports a direct link setup (DLS), whether the first device supports a tunneled direct link setup (TDLS) and whether the first device supports an independent basic service set (IBSS) network.

3. The method of claim 1, wherein the frequency band change request frame further comprises preference connection information representing a type of connection that the first device desires to set with the second device in the other frequency band, and
   wherein the preference connection information represents one connection type preferred by the first device from a connection type list comprising at least one of a basic service set (BSS) network connection type, a personal basic service set (PBSS) network connection type, an independent basic service set (IBSS) network connection type, a direct link setup (DLS) connection type and a tunneled direct link setup (TDLS) connection type.

4. The method of claim 3, wherein the frequency band change request frame further comprises at least one of information regarding channels allowed in different countries, from among a plurality of channels of the other frequency band, information regarding a channel to be used by the first device for communication in the other frequency band, and an identifier of a network to which the first device belongs in the frequency band currently being used.

5. The method of claim 1, wherein the frequency band change request frame further comprises device role information representing information regarding at least one of whether the first device is performing a role of an access point (AP) or a personal basic service set (PBSS) control point (PCP), whether the first device is using a direct link setup (DLS), whether the first device is using a tunneled direct link setup (TDLS) and whether the first device is operating as a station in an independent basic service set (IBSS) network, in the other frequency band.

6. The method of claim 1, wherein the frequency band change response frame selectively further comprises information regarding a communication capability of the second device.

7. The method of claim 1, wherein the selectively changing of the frequency band currently being used comprises changing the frequency band currently being used to the other frequency band only when the frequency band change response frame comprises information for accepting the frequency band change request of the frequency band change request frame.

8. A non-transitory computer readable recording medium having recorded thereon a computer program for executing the method of claim 1.

9. The method according to claim 1, wherein the frequency band change request frame comprises a plurality of fields describing a multiband information element.

10. The method according to claim 1, wherein the frequency band change response frame comprises a plurality of fields describing a multiband information element.

11. The method according to claim 1, wherein the method is implemented as a fast session transfer (FST) method.

12. The method according to claim 1, wherein the method is implemented under an IEEE 802.11ad standard.

13. An apparatus for changing a frequency band used for communication between a first device and a second device, the first and the second devices supporting multiple frequency bands, the apparatus comprising:
   a transmission unit which transmits a frequency band change request frame for requesting a change in a frequency band currently being used for communication between the first and the second devices, to the second device, wherein the frequency band change request frame comprises information regarding a communication capability of the first device and a frequency band change request;
   a reception unit which receives a frequency band change response frame corresponding to the frequency band change request frame, from the second device; and
   a frequency band change unit which selectively changes the frequency band currently being used to another frequency band based on the received frequency band change response frame,
   wherein the frequency band change response frame comprises information regarding whether to accept or reject the frequency band change request of the frequency band change request frame.

14. The apparatus of claim 13, wherein the information regarding the communication capability of the first device comprises information regarding at least one of whether the first device is capable of performing a role of an access point (AP) or a personal basic service set (PBSS) control point (PCP), whether the first device supports a direct link setup (DLS), whether the first device supports a tunneled direct link setup (TDLS) and whether the first device supports an independent basic service set (IBSS) network.

15. The apparatus of claim 13, wherein the frequency band change request frame further comprises preference connection information representing a type of connection that the first device desires to set with the second device in the other frequency band, and
   wherein the preference connection information represents one connection type preferred by the first device from a connection type list comprising at least one of a basic service set (BSS) network connection type, a personal basic service set (PBSS) network connection type, an independent basic service set (IBSS) network connection type, a direct link setup (DLS) connection type and a tunneled direct link setup (TDLS) connection type.

16. The apparatus of claim 15, wherein the frequency band change request frame further comprises at least one of information regarding channels allowed in different countries, from among a plurality of channels of the other frequency band, information regarding a channel to be used by the first device for communication in the other frequency band, and an identifier of a network to which the first device belongs in the frequency band currently being used.

17. The apparatus of claim 13, wherein the frequency band change request frame further comprises device role information representing information regarding at least one of whether the first device is performing a role of an access point (AP) or a personal basic service set control point (PCP), whether the first device is using a direct link setup (DLS), whether the first device is using a tunneled direct link setup (TDLS) and whether the first device is operating as a station in an independent basic service set (IBSS) network, in the other frequency band.

18. The apparatus of claim 13, wherein the frequency band change response frame selectively further comprises information regarding a communication capability of the second device.

19. The apparatus of claim 13, wherein the frequency band change unit changes the frequency band currently being used to the other frequency band only when the frequency band change response frame comprises information for accepting the frequency band change request of the frequency band change request frame.

* * * * *